(12) United States Patent
Miyamoto

(10) Patent No.: US 6,593,965 B1
(45) Date of Patent: Jul. 15, 2003

(54) CCD DATA PIXEL INTERPOLATION CIRCUIT AND DIGITAL STILL CAMERA EQUIPPED WITH IT

(75) Inventor: Keisuke Miyamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/162,510

(22) Filed: Sep. 29, 1998

(30) Foreign Application Priority Data

Sep. 29, 1997 (JP) ............................................. 9-263428

(51) Int. Cl.[7] .......................... H04N 3/14; H04N 5/235
(52) U.S. Cl. ..................... 348/280; 348/230.1; 382/300
(58) Field of Search .......................... 348/220.1, 221.1, 348/222.1, 224.1, 229.1, 230.1, 241, 242, 263, 272, 273, 280; 358/518, 525; 382/162, 167, 298, 299, 300; H04N 5/235, 3/14

(56) References Cited

U.S. PATENT DOCUMENTS

| | | | | |
|---|---|---|---|---|
| 4,642,678 A | * | 2/1987 | Cok ............................ 348/242 |
| 4,967,264 A | * | 10/1990 | Parulski et al. ............. 348/271 |
| 5,519,452 A | * | 5/1996 | Parulski ..................... 348/220.1 |
| 5,734,427 A | | 3/1998 | Hayashi ....................... 348/333 |
| 5,828,406 A | * | 10/1998 | Parulski et al. ........... 348/220.1 |
| 5,909,247 A | | 6/1999 | Hosokai et al. ............. 348/302 |

FOREIGN PATENT DOCUMENTS

| | | | |
|---|---|---|---|
| JP | 7-312714 | 11/1995 | .......... H04N/5/228 |
| JP | 9-163245 | 6/1997 | |
| JP | 9-233394 | 9/1997 | |

\* cited by examiner

Primary Examiner—Ngoc-Yen Vu
(74) Attorney, Agent, or Firm—Foley & Lardner

(57) ABSTRACT

A pixel interpolation circuit in the digital still camera according to the present invention, filters unnecessary pixel data from pixel data read out from a CCD which has captured an image, and stores only necessary pixel data for a pixel interpolation operation, in a dual-port data buffer. At the same time, the pixel interpolation circuit reads out necessary data for the pixel interpolation operation, from the data buffer, performs the pixel interpolation operation, and stores the result in a video memory. The pixel interpolation operation is performed by weighting pixels to be used for the pixel-interpolation operation, in accordance with the distance between a pixel to be interpolated and each of the to-be-weighted pixels.

5 Claims, 7 Drawing Sheets

CCD DATA PIXEL INTERPOLATION CIRCUIT AND DIGITAL STILL CAMERA EQUIPPED WITH IT

BACKGROUND OF THE INVENTION

1. Field of the Invention

The present invention relates to a CCD (Charge Coupled Device) data pixel interpolation circuit and a digital still camera equipped with it, specifically to a CCD data pixel interpolation circuit which filters (thins out) data received from a CCD, interpolates the resulting data, and displays it on a display unit, and a digital still camera equipped with the interpolation circuit.

2. Description of the Related Art

A CCD is normally used for the image pickup device of a digital still camera. Image data captured by it is stored in a storage medium such as a compact flash memory or an IC memory card. To monitor the captured image, a display means such as an LCD (Liquid Crystal Display) is generally equipped in the digital still camera. In general, since the resolution of the display means such as an LCD is inferior to that of the CCD, pixel data captured by the CCD needs to be filtered (thinned out) and also interpolated.

FIG. 7 shows the configuration of the conventional CCD pixel interpolation circuit. A CCD 41 captures an image. Data from the CCD 41 is temporarily stored in a DRAM (Dynamic Random Access Memory) 43. An image processing control unit 42 reads in the data from the DRAM 43, performs a predetermined image processing, and writes the resulting data into a video memory 44. An LCD 45 displays the data stored in the video memory 44. A CCD controller 46 generates a pulse signal and other related signals to be used for reading data from the CCD 41. The CCD 41, the image processing control unit 42, the DRAM 43, and the video memory 44 are all connected to a main data bus 47.

The operation of pixel interpolation will then be explained with reference to FIG. 3 showing the configuration of the CCD. Either one of the primary color filters for R(Red), G(Green) and B(Blue) is attached on each pixel. A color signal corresponding to one of the colors R, G, and B is output from each pixel. Each line of data of the CCD 41 is read out. For example, pixels R11, G12, R13, G14, . . . in the first line are accessed in the order written. To obtain the red component value of the pixel B22, the average of the values of diagonally neighboring pixels R11, R13, R31, and R33 is calculated. The average is used to display an image of R22 on the LCD 45. Therefore, the average R22 cannot be calculated (in other words, a pixel interpolation of R22 cannot be made) until the value of pixel R33 in the next line has been read out. To make a pixel interpolation of the line including R22, three consecutive lines of pixel data have to be temporarily stored in a memory such as DRAM 43.

Furthermore, since CCD 41(see FIG. 7) cannot halt the pixel data capturing operation in general, the image processing control unit 42 must start a pixel interpolation operation after the CCD 41 has completed transmitting data. Therefore, it takes a long time to store all interpolated pixel data in the video memory 44 and also to display it on the LCD 45.

The aforementioned conventional CCD data pixel interpolation circuit has a problem that a large-scale memory such as a DRAM is needed to temporarily store pixel data.

Moreover, the pixel interpolation operation starts when all CCD pixel data is transmitted. Therefore, it takes a long time to store all the interpolated pixel data in the video memory and also to display it on the LCD.

SUMMARY OF THE INVENTION

It is an object of the present invention to provide a simple structured CCD pixel data interpolation circuit without a memory such as a DRAM which is used to temporarily store pixel data. The CCD pixel data interpolation circuit generates pixel data, which will be displayed on an LCD, at a high speed.

According to an aspect of the present invention, the CCD pixel data interpolation circuit filters(thins) out pixel data read out from the CCD, stores the filtered (thinned out) pixel data in a data buffer, reads out the stored pixel data from the data buffer, pixel-interpolates, and outputs the resulting pixel data to a display unit.

According to an aspect of the present invention, in the aforementioned CCD pixel data interpolation circuit, its pixel-interpolation operation is performed by weighting according to the distances from pixels used for the interpolation operation. According to an aspect of the present invention, the CCD pixel data interpolation circuit filters pixel data read out from a CCD, and stores the filtered (thinned out) pixel data in a video buffer, and pixel-interpolates the pixel data stored in the video memory.

According to an aspect of the present invention, a digital still camera comprises: a CCD, which captures an image; a display unit, which displays the pixel data obtained by subjecting the pixel data captured by the CCD to a predetermined operation; and a CCD pixel data interpolation circuit, which filters pixel data read out from the CCD, stores it in a data buffer, reads it out from the data buffer, pixel-interpolates using it, and outputs the resulting pixel data to a display unit, wherein the pixel-interpolating is done by weighting according to the distances from the filtered (thinned out) pixels used for pixel-interpolation.

According to an aspect of the present invention, a digital still camera comprises: a CCD, which captures an image; a display unit, which displays the pixel data obtained by subjecting the pixel data captured by the CCD to a given operation; and a CCD pixel data interpolation circuit, which filters the pixel data read out from the CCD; stores it in a video memory, reads it out from the data buffer, and pixel-interpolates using the pixel data stored in the video memory within the time period of outputting the filtered (thinned out) pixel data from the CCD.

According to an aspect of the present invention, the display unit in the aforementioned digital still camera is an LCD.

BRIEF DESCRIPTION OF DRAWINGS

Other features and advantages of the invention will be made more apparent by the detailed description that follows, taken in conjunction with the accompanying drawings, wherein.

DETAILED DESCRIPTION OF THE PREFERRED EMBODIMENTS

Figure 1:
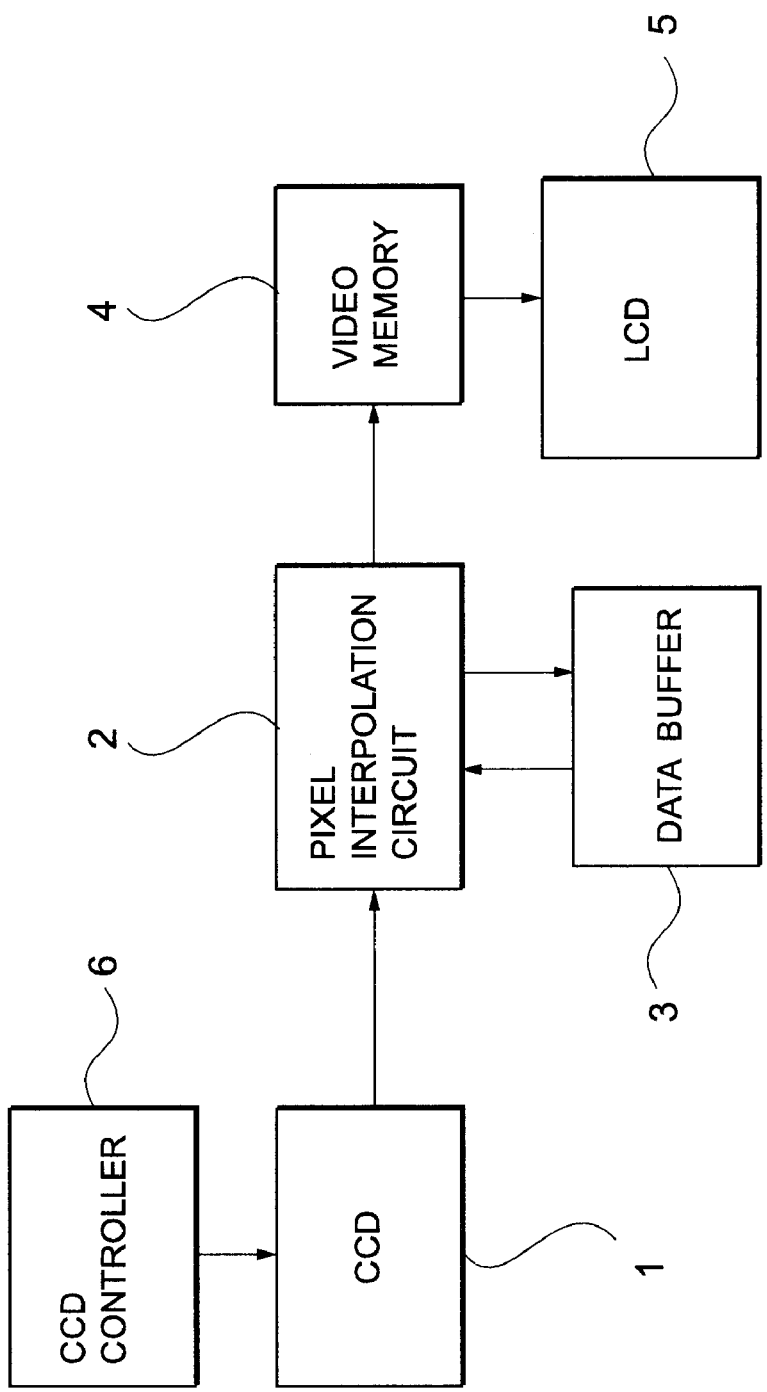
FIG. 1 shows the configuration of a first embodiment of the present invention.

Preferred embodiments of the present invention will be explained hereafter with reference to several figures. FIG. 1 shows the configuration of a first embodiment of the present invention. Display means such as an LCD is inferior in resolution compared to that of the CCD, in general. Thus, an interpolation for all pixel data is unnecessary. Hereafter, we assume that the numbers of horizontal and vertical pixels of the LCD are half those of the CCD pixels, respectively.

A CCD 1 captures an image. A data buffer 3 is capable of accommodating three lines of pixel data (the number of which being equal to half in each single line of the CCD 1). Its input/output circuit is formed in a dual-port structure. A pixel interpolation circuit 2 transmits pixel data output from the CCD 1, to the data buffer 3. At the same time, it also reads in data from the data buffer 3, interpolates it, and stores the resulting pixel data in a video memory 4. The same pixel data stored in the video memory 4 is repeatedly displayed until the LCD 5 has been updated. A CCD control unit 6 generates a pulse signal and other related signals to be used for reading pixel data from the CCD 1.

Figure 2:
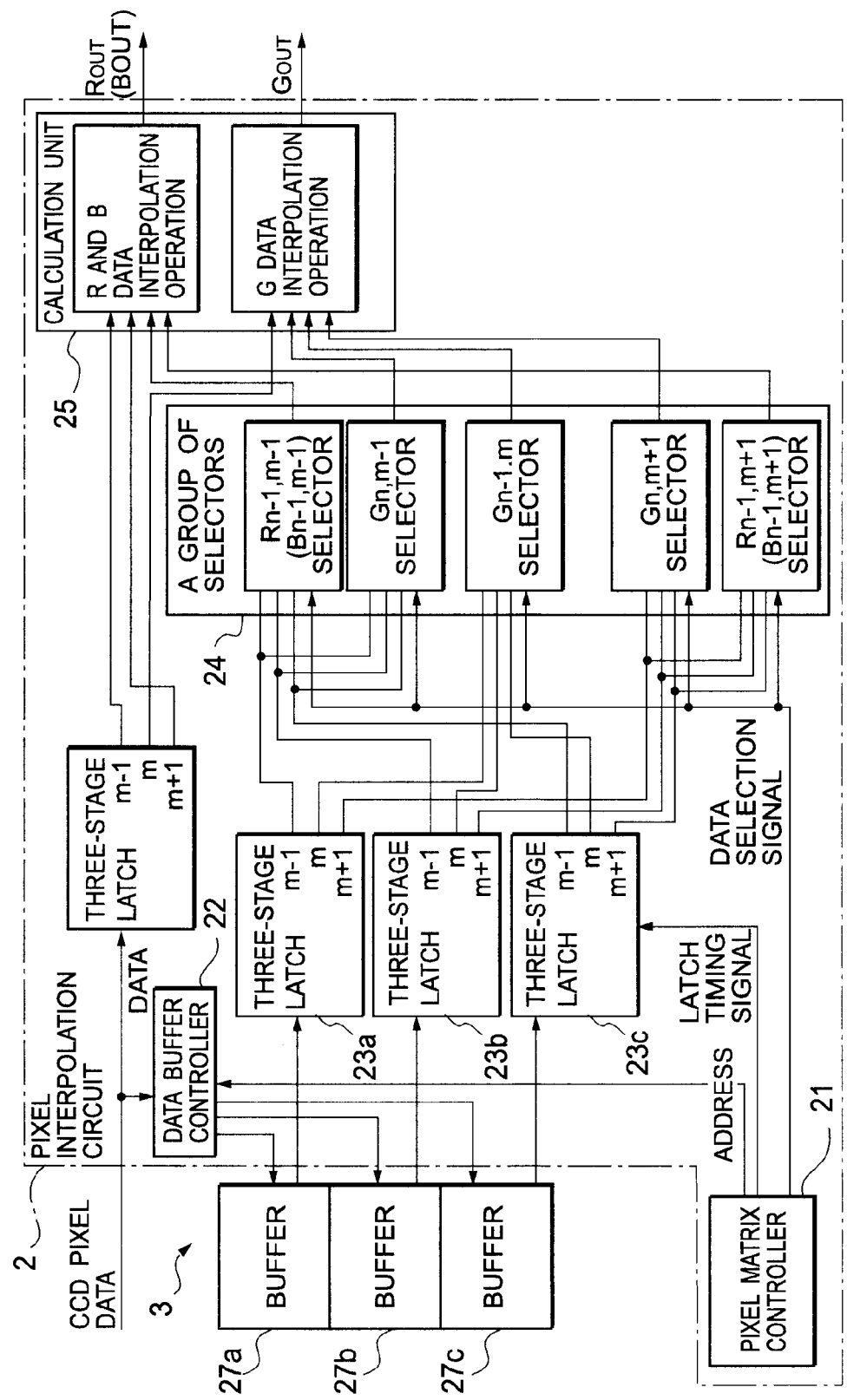
FIG. 2 shows the configuration of both a pixel interpolation circuit and data buffers of the first embodiment of the present invention.

FIG. 2 shows the circuit configuration of both the pixel interpolation circuit 2 and the data buffer 3. A pixel matrix controller 21 designates one of the buffers 27a, 27b, and 27c (to which CCD pixel data is transmitted) to a data buffer controller 22. It also transmits a column address to the data buffer 3, via the data buffer controller 22. Accordingly, the data buffer outputs data located in the address. It also outputs a data selection signal, selecting a line of pixel data for calculation unit 25.

The pieces of data output from the buffers 27a, 27b, and 27c are latched by three-stage latches 23a, 23b, and 23c, respectively. Accordingly, three lines of pixel data stored in the latches can all be accessed. A group of selectors 24 connected to the respective latches selects pixel data, and outputs it to a subsequent calculation unit 25 for a mathematical operation. Since pixels used in a red and blue pixel interpolation operation defer from those used in a green pixel interpolation operation, different pieces of selected data are used by a red and blue pixel interpolation operation unit and a green pixel interpolation operation unit, respectively.

In an alternative configuration, additional selectors can be prepared before and after the calculation unit 25. With this configuration, the red and blue pixel interpolation operation and the green pixel interpolation operation are both performed by a single operation unit in a time sharing fashion.

Figure 3:
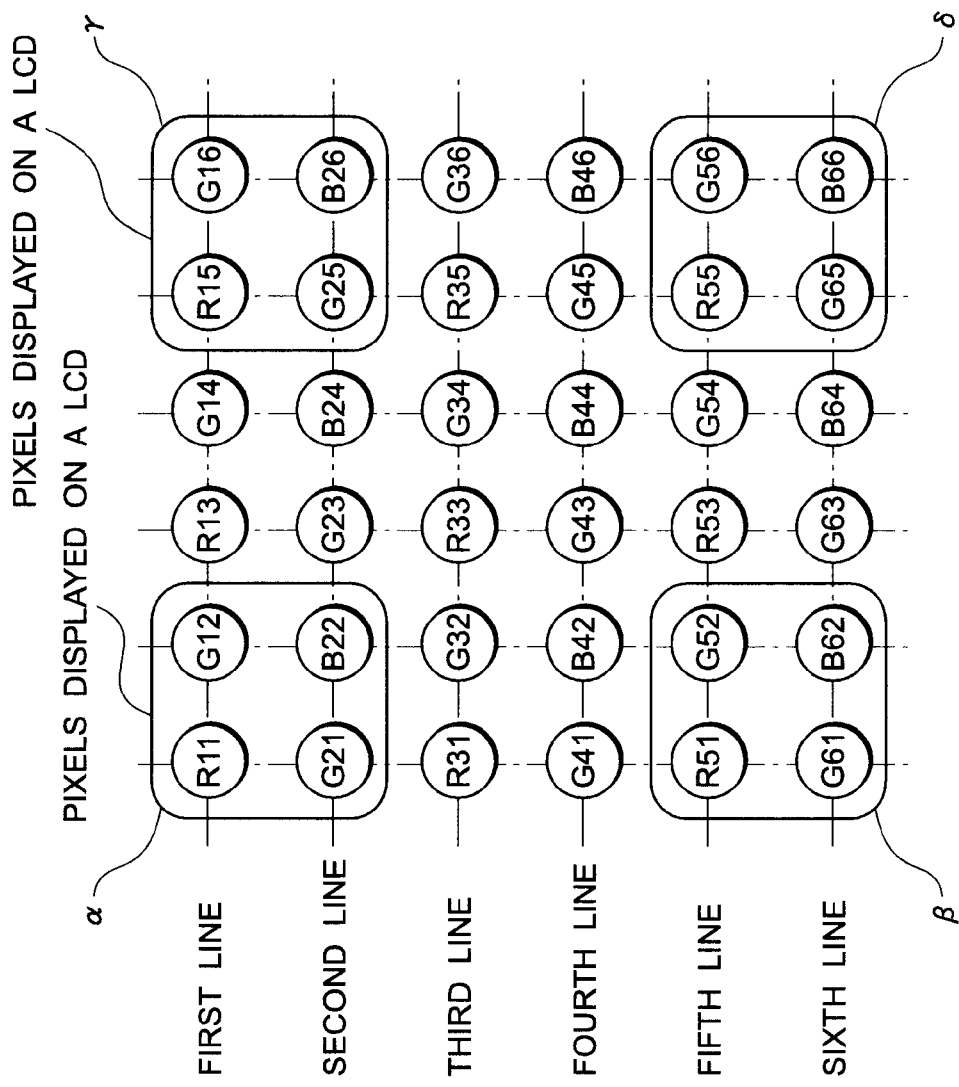
FIG. 3 shows the configuration of a CCD.

The operation with the configuration will then be explained. To begin with, the configuration of the CCD 1 will be described in detail with reference to FIG. 3. As shown in FIG. 3, RGB filter matrices, each being made up of four neighboring elements, are lined up. To generate a horizontally and vertically reduced image of half in each direction, each group of four neighboring elements is filtered (thinned out) into the half the number, and the resulting half is then read out. Each of the four groups of pixel data enclosed by lines in FIG. 3 is then stored in the data buffer 3.

More specifically, the pieces of pixel data are stored in the CCD 1 in both the horizontal order of 1, 2, . . . , 5, 6, . . . and the vertical order of 1, 2, . . . , 5, 6, . . . . The CCD 1 is configured in such a manner that each line of pixel data is selected one after another, and read out in sync with a vertical transmission pulse signal of the CCD 1, in the order of pixel data R11, G12, R13, G14, . . . , G21, B22, G23, B24 . . . . As for unnecessary lines, the CCD controller 6 adds excessive pulse signals to the vertical transmission pulse signal, resulting in skipping the unnecessary lines. Therefore, the read-out time period will be reduced to half.

The pixel interpolation operation will then be explained. In the conventional technology, the average of neighboring pixels is utilized. However, since the filtered (thinned out) pixel data is stored in the data buffer 3, the distance between the neighboring filtered pixels is different from that between the initially captured pixels. Thus, the pixel interpolation operation cannot be correctly performed with the filtered (thinned out) pixels. To solve the problem, the filtered (thinned out) pixels are each weighted, and subjected to the pixel interpolation operation. For example, to perform an pixel interpolation operation on the red component R22 at the pixel B22 in FIG. 3, the pixels R11, R51, R15, and R55 are used to interpolate R22 in conformity with the following equation:

$$R22 = \alpha \cdot R11 + \beta \cdot R51 + \gamma \cdot R15 + \delta \cdot R55$$

where $$\alpha + \beta + \gamma + \delta = 1$$

Next, the correction coefficients $\alpha$, $\beta$, $\gamma$, and $\delta$ will be explained. It is assumed that the four neighboring pixels enclosed by each line in FIG. 3 are involved in a single group. The correction coefficient $\alpha$ is assigned to the upper left group, as an example. Correction coefficients $\beta$, $\gamma$, and $\delta$ dare also assigned to respective groups located in the vertical, horizontal, and diagonal directions from the upper left group, respectively. Weighting calculations based upon the distance between R22 and each corresponding pixel by using the correction coefficients $\alpha$, $\beta$, $\gamma$, and $\delta$ is done. Specifically, among the correction coefficients the largest value is set to $\delta$, which is to be multiplied by the nearest neighboring and most deeply related pixel R11. On the other hand, the smallest value is set to the correction coefficient $\delta$, which is to be multiplied by the least related pixel R55. Certain intermediate values are set to the correction coefficients $\beta$ and $\delta$, respectively. More specifically, the ratio of $\alpha$, $\beta$, $\gamma$, and $\delta$ is determined in such a way that the ratio of the inverse numbers to $\alpha$, $\beta$, $\gamma$, and $\delta$ can be equal to that of the distances: from R11 to B22, from R51 to B22, from R15 to B22, and from R55 to B22. The correction coefficients $\alpha$, $\beta$, $\gamma$, and $\delta$ can then be fixed based upon the ratio.

As an example, specific correction coefficients $\alpha$, $\beta$, $\gamma$, and $\delta$ will be determined in the following manner. To calculate the red component R22 at the location of the pixel B22, the following equation is calculated in the aforementioned manner:

$$1/\alpha : 1/\beta : 1/\gamma : 1/\delta = \sqrt{2} : \sqrt{10} : \sqrt{10} : \sqrt{2}$$

Of the possible combinations of values of $\alpha$, $\beta$, $\gamma$, and $\delta$ satisfying the above equation, a specific combination which satisfies the following constraints on $\alpha$, $\beta$, $\gamma$, and $\delta$ is then selected.

$$\alpha = 0.4 - 0.5$$

$$\beta = \gamma = 0.2 \pm 0.05$$

$$\delta = 0.1 - 0.2$$

where $$\alpha + \beta + \Delta + \delta = 1$$

Through weighting calculations using the selected coefficients α, β, γ, and δ in accordance with the respective distances from R22, an exact corrective operation can be performed. The aforementioned operations of reading the CCD data and of pixel-interpolation are concurrently processed.

Figure 4:
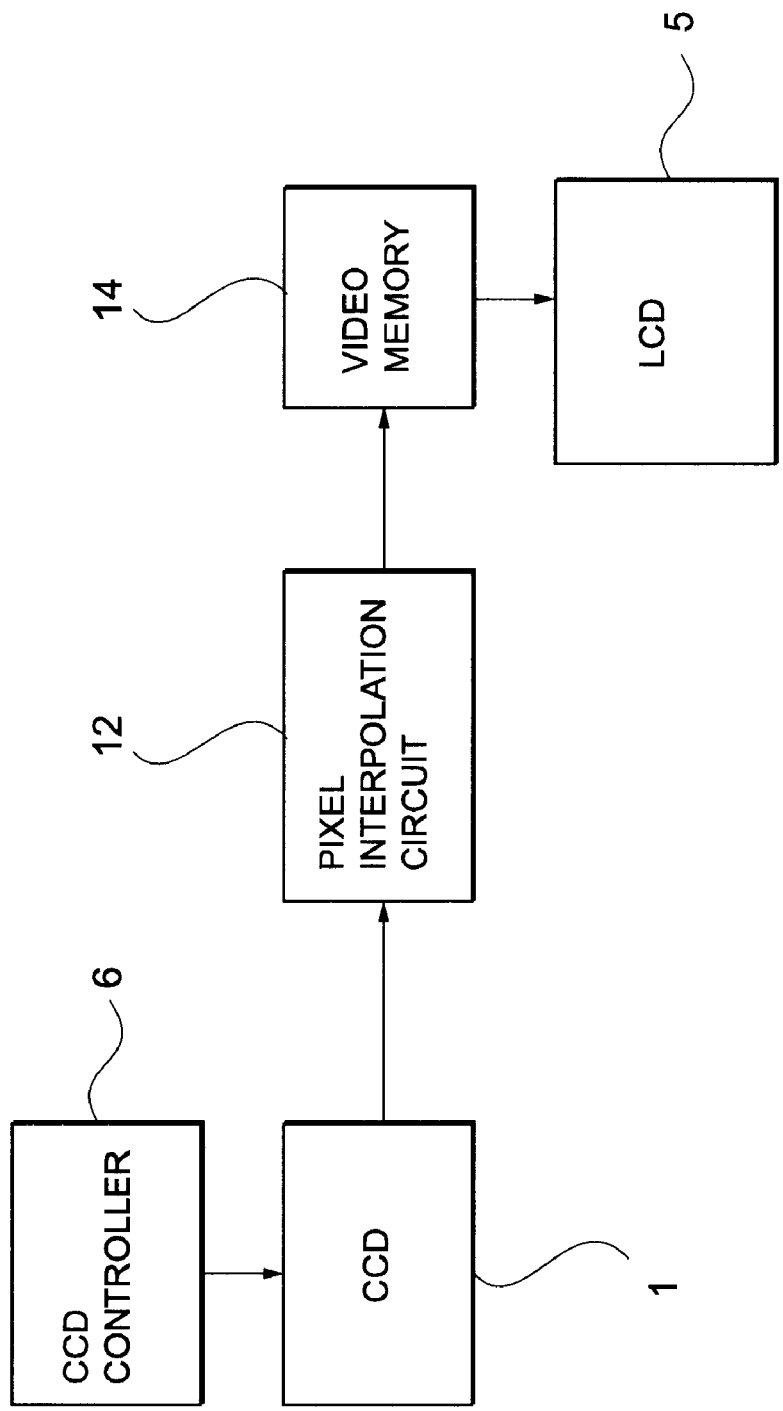
FIG. 4 shows the configuration of a second embodiment.

Next, a second embodiment of the present invention will be described hereafter with reference to several figures. FIG. 4 shows the configuration according to the second embodiment of the present invention. The second embodiment is different from the first embodiment as shown in FIG. 1 in that the second embodiment does not comprise a data buffer.

As described in the first embodiment, the number of lines of pixel data to be read out from the CCD 1 is equal to half of the whole lines, and data transmission time for an image is also equal to half. However, in the following description, the operation of reading out all lines of pixel data from the CCD 1 will be described. In this operation, a data buffer is unnecessary to simultaneously display an image and pixel-interpolate. With the configuration in FIG. 4, pixel data and displayed data are both stored in a video memory 14.

Figure 5:
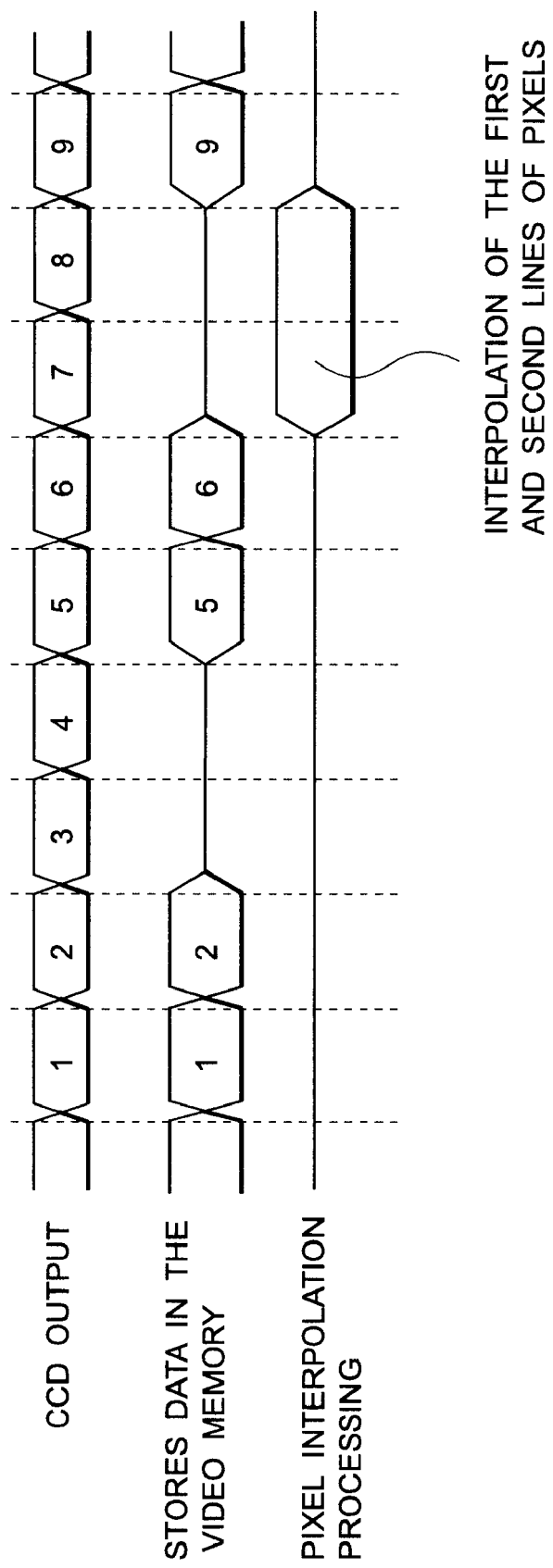
FIG. 5 is a timing chart showing the operation of the second embodiment.

Next, the operation will be described in detail. FIG. 5 is a timing chart showing the operation of the second embodiment of the present invention. A pixel interpolation circuit 12 transmits no more than the first, second, fifth, and sixth lines of pixel data from the CCD 1, to the video memory 14. Within the subsequent time period of outputting the seventh and eighth lines of pixel data received from the CCD 1, no more pixel data is stored in the video memory 14. Accordingly, the first and second lines of pixel data are both subjected to pixel-interpolation operation in this time period.

Figure 6:
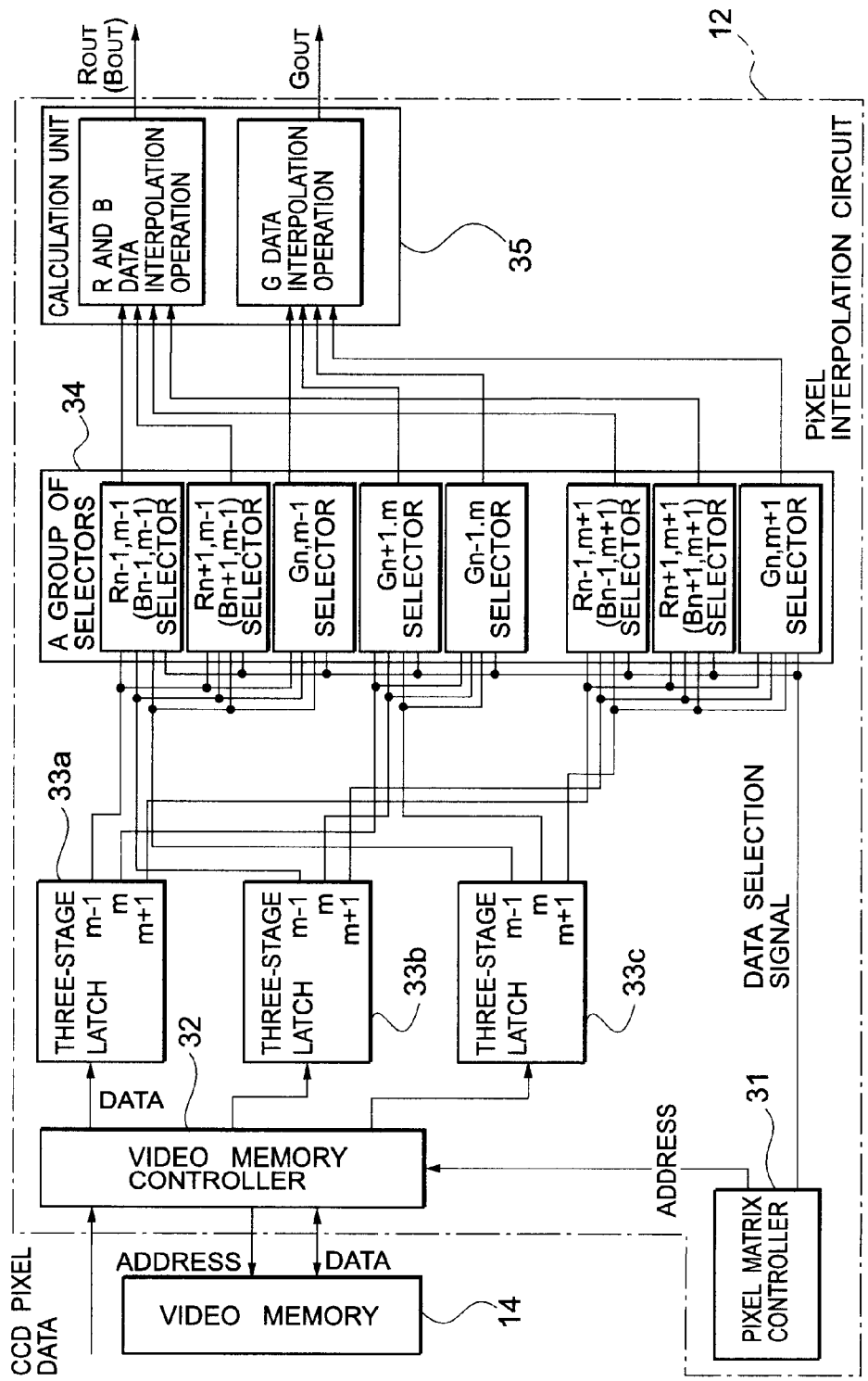
FIG. 6 shows the configuration of both a pixel interpolation circuit and a video memory of the second embodiment of the present invention.
Figure 7:
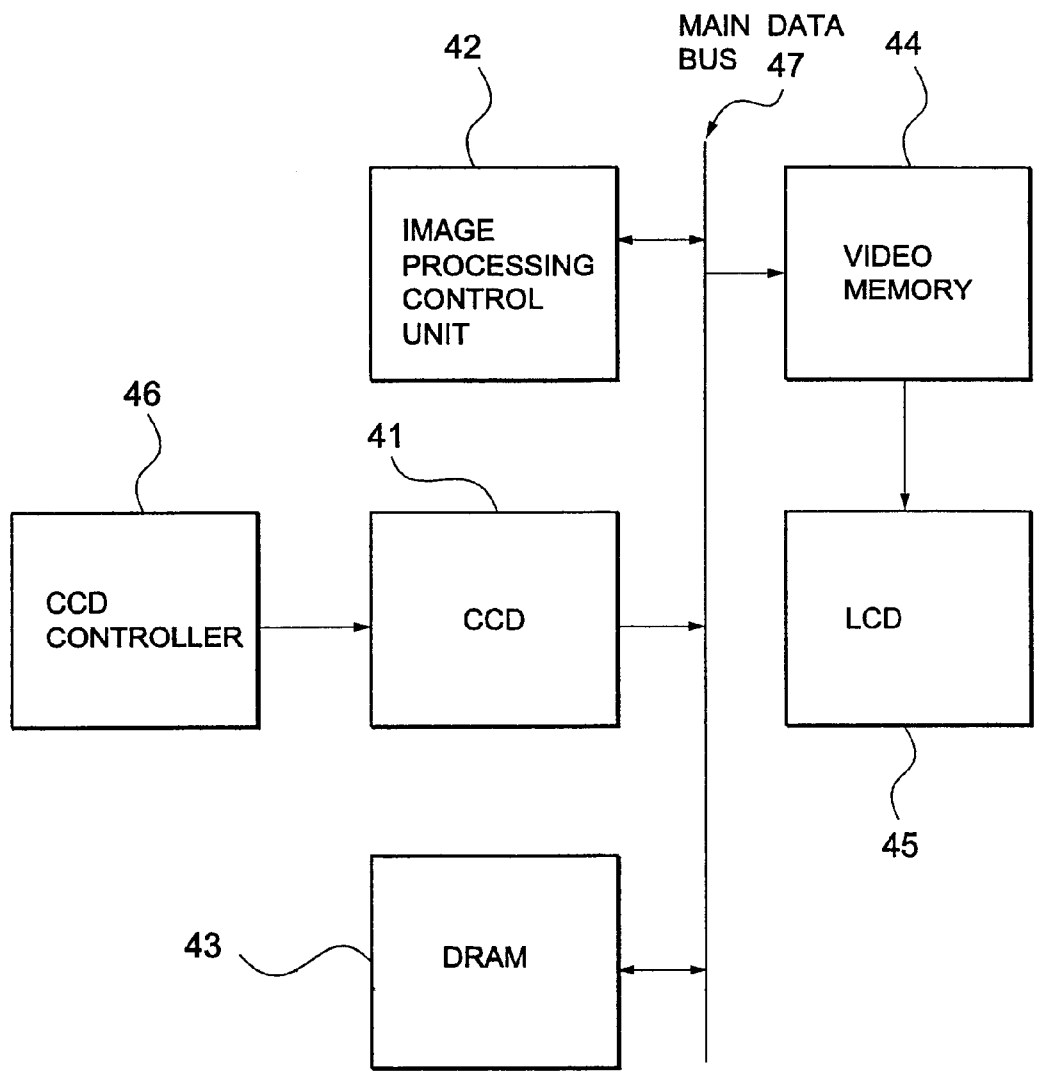
FIG. 7 shows the configuration of the conventional circuit.

FIG. 6 is the circuit configuration of both the pixel interpolation circuit 12 and the video memory 14. The circuit in FIG. 6 will be explained, taken in conjunction with the operation shown in FIG. 5. Within the time period of outputting the first and second lines of pixel data received from the CCD 1, the pixel matrix controller 31 stores CCD pixel data in the video memory 14, via video memory controller 32. Within the subsequent time period of outputting the third and fourth lines of pixel data, the pixel interpolation circuit 12 does not halt its operation.

Within the time period of outputting the fifth and sixth lines of pixel data, pixel data is transmitted to the video memory 14 in the same manner as in the first and second lines. Within the time period of outputting the seventh and eighth lines of pixel data, pixel interpolation data and other related data used in the interpolation operation are both read in from the video memory 14. The pixel-interpolation operation is then performed with the help of all three latches 33a, 33b, and 33c, selectors 34, and a calculation unit 35.

Through the above-mentioned operation, the operation of pixel-interpolating and reading pixel data out from the CCD1 can both be simultaneously performed without a buffer memory. Therefore, data to be displayed on the LCD can be generated at a high speed.

In the first and second embodiments, the case that the numbers of vertical and horizontal pixels displayed on the LCD are both equal to half those of the CCD, has been described. However, it is noted that the ratio is not limited to be 1:2. By changing the number of pixels between neighboring pixel blocks (each being made up of four pixels), other corresponding ratios can be used, accordingly. Moreover, the display is not limited to the LCD.

As described above, according to the present invention, since the operations of reading in and outputting pixel data to the video memory are simultaneously performed, display on the LCD is made without delay.

Moreover, since interpolated data is weighted according to the inter-pixel distance in the interpolation operation, possible noises on displayed data, which emanates from a filtering (thinning out) operation on pixel data, can be controlled.

Furthermore, since all neighboring pixel data is unnecessary for the pixel interpolation operation, no more than half the data in the vertical direction is read out from the CCD. Therefore, the operating time is only the half of that in the conventional method, assuring a high-speed operation of the CCD. In addition, the amount of electric power consumed is reduced.

Note that as many apparently widely different embodiments of the present invention can be made without departing from the spirit and scope thereof, it is to be understood that the invention is not limited to the specific embodiments thereof; except as defined in the appended claims.

What is claimed is:

1. A CCD pixel data interpolation circuit wherein pixel data read out from a CCD is filtered (thinned out), and stored in a video buffer; and within the time period of outputting the filtered (thinned out) pixel data from the CCD, the pixel data stored in the video memory is subjected to a pixel-interpolation operation;

wherein the pixel-interpolation operation is performed by calculating according to distances from pixels used for pixel-interpolation operation; and wherein with four pixels as in the same group, a color component X00 involved in said same group is calculated using the following equations:

$$X00 = \alpha \cdot X11 + \beta \cdot X21 + \gamma \cdot X12 + \delta \cdot X22$$

$$\alpha + \beta + \gamma + \delta = 1$$

where: X11 denotes a pixel with the same color as that of X00, which is included in the same group of X00; X21 denotes a pixel with the same color as that of X00, which is included in a neighboring group located in the vertical direction to the group of X00 after filtering (thinning out); X12 denotes a pixel with the same color as that of X00, which is included in a neighboring group located in the horizontal direction to the group of X00 after filtering (thinning out); and X22 denotes a pixel with the same color as that of X00, which is included in a neighboring group located in the diagonal direction to the group of X00 after filtering (thinning out).

2. The CCD pixel data interpolation circuit according to claim 1, wherein α, β, γ, and δ are determined so that the ratio of the inverse numbers to α, β, γ, and δ can be equal to that of the distances: from X11 to X00, from X21 to X00, from X12 to X00, and from X22 to X00.

3. A digital still camera, comprising:

a CCD for capturing an image;

a display unit for displaying pixel data obtained by subjecting pixel data captured by the CCD to a predetermined process;

a video memory; and a CCD pixel data interpolation circuit configured for: filtering (thinning out) pixel data read out from the CCD; storing it in the video memory; reading it from a data buffer; and pixel-interpolating using the pixel data stored in the video memory within the time period of outputting the filtered (thinned out) pixel data from the CCD, wherein with four pixels in a same group, a color component X00 involved in said same group is calculated using the following equations:

$$X00 = \alpha \cdot X11 + \beta \cdot X12 + \delta \cdot X22$$

$$\alpha + \beta + \gamma + \delta = 1$$

where: X11 denotes a pixel with the same color as that of X00, which is included in the same group of X00; X21 denotes a pixel with the same color as that of X00, which is included in a neighboring group located in the vertical direction to the group of X00 after filtering (thinning out); X12 denotes a pixel with the same color as that of X00, which is included in a neighboring group located in the horizontal direction to the group of X00 after filtering (thinning out); and X22 denotes a pixel with the same color as that of X00, which is included in a neighboring group located in the diagonal direction to the group of X00 after filtering (thinning out).

4. The CCD pixel data interpolation circuit according to claim 3, wherein $\alpha$, $\beta$, $\gamma$, and $\delta$ are determined according to distances from pixels used for the pixel-interpolation operation.

5. The CCD pixel data interpolation circuit according to claim 4, wherein $\alpha$, $\beta$, $\gamma$, and $\delta$ are determined so that the ratio of the inverse numbers to $\alpha$, $\beta$, $\gamma$, and $\delta$ can be equal to that of the distances: from X11 to X00, from X21 to X00, from X12 to X00, and from X22 to X00.

* * * * *